Sept. 15, 1959  H. J. NOLTE  2,904,456
METALIZING CERAMICS
Filed May 14, 1956

INVENTOR:
HENRY J. NOLTE,
BY Nathan Jomfrd
HIS ATTORNEY.

United States Patent Office 2,904,456
Patented Sept. 15, 1959

2,904,456

METALIZING CERAMICS

Henry J. Nolte, Schenectady, N.Y., assignor to General Electric Company, a corporation of New York Application May 14, 1956, Serial No. 584,664

4 Claims. (Cl. 117—212)

My invention relates to metalizing ceramics and more particularly to improved metalized coatings for ceramics and to improved methods of applying intimately bonded layers of metals to the surfaces of ceramic members.

The present invention is an improvement over that described and claimed in my U.S. Patents 2,667,427 and 2,667,432, assigned to the assignee of the present invention. Heretofore, there has been disclosed methods of metalizing ceramic surfaces using a mixture of metallic powders comprising elemental manganese and a metal selected from the group consisting of molybdenum, tungsten, and iron, and mixtures thereof. Further, ceramic members have been disclosed having metalized surfaces comprising manganese and a metal selected from the group consisting of molybdenum, tungsten, iron, nickel and mixtures thereof. The method of coating ceramic members with a metal coating including manganese, and the ceramic members having said type coatings as disclosed, are suitable for many applications. However, special problems are encountered when ceramic members are employed as insulators in, for example, certain types of electron tubes. Ceramics employed as insulators in the base of electron tubes usually have apertures therein through which various metallic wire leads must pass. The ceramic base in addition to hermetically sealing to the discharge device envelope, must also hermetically seal to the wire leads to form a vacuum-tight closure. The apertures in the ceramic base usually have a very small diameter, in the order of 0.033 inch, and it is difficult to obtain a uniform layer of the metalizing material on the walls of the apertures to obtain a metallic surface to which the wire leads may be bonded.

Further, in some electron tube applications ceramics of very high strength must be employed as insulators. Ceramics of this type are the high purity alumina type bodies which are highly refractory and therefore difficult to metalize by conventional means. I have found improved methods to satisfactorily solve these problems and to obtain high production of such metalized ceramic members.

Accordingly, it is a principal object of my invention to provide improved methods of metalizing ceramic members including methods of metalizing the interior surfaces of apertures in said members.

It is another object of my invention to provide improved methods of metalizing high refractory ceramic members.

It is another object of my invention to provide ceramic members having improved metalized surfaces on high refractory ceramic members.

In the attainment of the foregoing objects, I provide improved methods for metalizing the surfaces of high refractory ceramic members consisting of applying a coating to said surfaces of a mixture of metallic powders comprising molybdenum powder and chromium, and improved methods for metalizing the interior of small apertures in ceramic members consisting of applying a coating to said surface of a mixture of metallic powders comprising manganese and molybdenum trioxide. I further provide ceramic members having suitably metalized surfaces comprising molybdenum and chromium to permit operation of said members in high temperature regions. The improved method involving the use of molybdenum and chromium powders referenced above and hereinafter described constitutes the subject of my Divisional Application Serial Number 782,991 entitled, "Metalizing Ceramics" filed December 4, 1958, and assigned to the same assignee as the present invention.

Other objects and advantages will become apparent after a consideration of the specification and the drawing in which.

Figure 1:
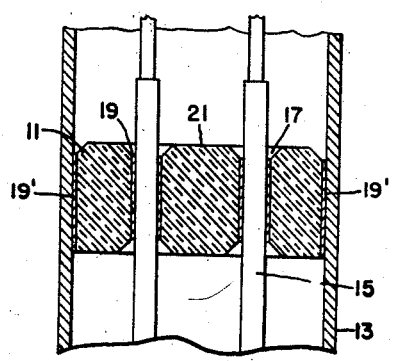
Figure 1 is a cross sectional view of a ceramic member disposed in the base portion of an electron discharge device and having lead wires extending therethrough in accordance with the present invention.
Figure 2:
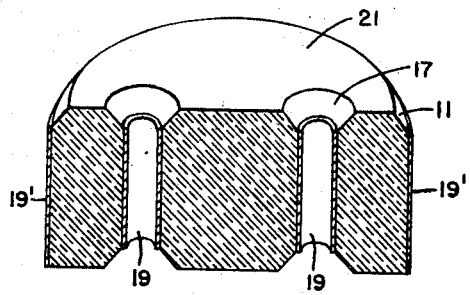
Figure 2 is an enlarged isometric view in cross section of the ceramic member of Figure 1.

In the construction of certain types of electron tubes, it is desired to have a base insulator material through which various wire leads must pass, and the base must be sealed vacuum tight to the leads and to the tube envelope. In Figure 1, a ceramic member 11 is shown disposed in the base portion 13 of a vacuum tube which may be of any otherwise conventional type having the usual anode, cathode and control electrodes which, in the interest of clarity are here omitted. Lead wires 15 from two of such electrodes are adapted to be coupled to a source of potential, not shown, and pass through apertures 17 in member 11. The wires 15 are sealed to member 11 through a metalized surface 19. Member 11 is bonded and sealed to base portion 13 through metalized coating 19'. As mentioned hereinabove, the metalizing of the apertures or holes 17 in the ceramic insulators 11 so that the wire leads 15 may be brazed therein has heretofore presented a problem, particularly because of the small diameters, in the order of 0.033 inch, of apertures 17. Obtaining uniformly coated apertures 17 with tolerances suitable for lead insertion is difficult when employing the prior art process. By using the improved metalizing method described hereinbelow, a uniform metallic coating in apertures 17 is obtained.

As an example of the metalizing process of the invention, a metalized coating will be described as applied to a ceramic member 11 of the type known as forsterite ceramic, having the formula $2MgO.SiO_2$, and which ceramic enjoys wide use in electron tube work. A powder mixture of approximately 80% molybdenum trioxide and approximately 20% manganese is produced, for example, by ball milling with a suitable vehicle such as acetone. Next, the vehicle is evaporated and the powder mixture pulverized to reduce the size of the mixture particles. To apply the metallic coating to the ceramic member 11, and so that the metallic coating will flow evenly over the entire surface of the ceramic member including the surfaces of the apertures 17, the same vehicle, namely acetone can be added to the pulverized powder mixture while the mixture is agitated, until a specific gravity of approximately 1.7 is reached. The metalizing mixture is kept in suspension by suitable means as for example, by a magnetic mixer. The ceramic member 11 is then immersed into a bath of metalizing mixture and the mixture penetrates the apertures 17 in the ceramic. Coating of the hole 17 interior must be accomplished in the dipping step since subsequent flow of the coating on heating does not provide sufficient thickness to be effective. Close control of coating thickness is obtained by maintaining the specific gravity at the established value, and by the rapid drying of the acetone vehicle after removal of the member from the bath.

The ceramic is next withdrawn from the mixture and allowed to dry. The ceramic member 11 with the applied coating mixture 19 and 19' is then fired in a non-oxidizing atmosphere, for example, a suitable hydrogen atmosphere to reduce the molybdenum trioxide to molybdenum. The ceramic member is heated to a temperature of approximately 1250° C., for a period of thirty minutes. After this has been accomplished the metals appear as a very tightly-adhering coatings 19 and 19' on the surface of the apertures 17 and on the outer surface of ceramic 11, respectively.

In the example given above, 20% manganese is used with a firing temperature of 1250° C. for thirty minutes. The amount of manganese employed varies with the desired factory processing. For example, for a given firing temperature, an increase in the amount of manganese will allow a shorter firing time, or for the same firing time will permit a lower firing temperature. The percentage manganese, the firing temperature and the firing time employed are related; for example, a mixture having 10% manganese may be fired at 1350° C. for thirty minutes and a mixture having 50% manganese may be fired at the lower temperature of 1200° C. for only fifteen minutes.

Definite advantages are obtained by employing molybdenum trioxide instead of molybdenum metal powder in the coating mixture. I have found that by using molybdenum trioxide a uniform coating on the surfaces of the apertures 17 can be obtained, in contrast to molybdenum metal powder which is awkward to use in metalizing the small apertures 17. Molybdenum trioxide tends to remain in suspension and is smooth and flows as a paint while molybdenum metal powder is granular, tacky, and does not flow easily. A powder mixture containing molybdenum metal powder tends to clog up the apertures 17 and thus prevents the mixture from flowing uniformly over the entire surface of the apertures, whereas a powder mixture containing molybdenum trioxide flows smoothly and uniformly over the entire surface of the apertures. Further, use of a solution vehicle consisting primarily of acetone provides a low viscosity suspension suitable for easy flow through the small diameter apertures 17. The above noted firing operation reduces the molybdenum trioxide to molybdenum metal and the resultant metallic coating consists of molybdenum metal and manganese.

Further, the method of this invention wherein molybdenum trioxide and manganese powder are used has various advantages over using a powder consisting solely of molybdenum trioxide. The addition of the manganese powder to the molybdenum trioxide results in more uniform coating without the flakly areas experienced with the molybdenum trioxide powder alone. This feature is important because flakiness is accompanied by lack of adhesion and by lack of uniform thickness both of which can cause vacuum leaks and weak junctions. Also, as noted above, the firing temperatures and firing times may be varied by using different percentages of manganese.

After the metal surface is applied to the ceramic member 11, the surfaces, as for example surface 21, can be ground to remove undesired metal surfaces to adapt the ceramic members for the intended use, say in a vacuum tube.

Figure 3:
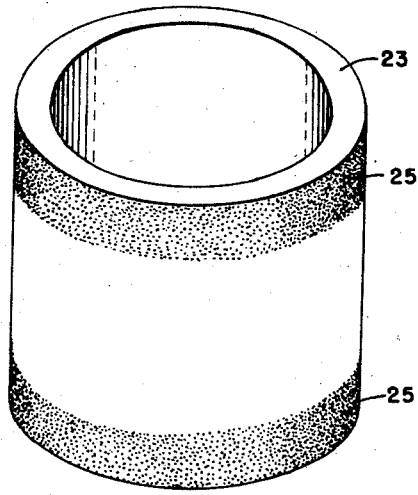
Figure 3 is an enlarged isometric view of a tubular ceramic insulating section having a metalized coating thereon in accordance with another feature of my invention.

Certain electron tubes also employ ceramic insulating members which are subjected to high temperature gradients and consequent high stress. Figure 3 shows a ceramic insulator 23 of a type and form used in electron tubes and having a chromium-molybdenum metal surface 25 thereon, suitable for bonding to metallic members, not shown. I have found that the use of chrominum as an element of the metalizing material produces excellent metal to ceramic coatings. Coating the high refractory ceramic bodies, for example, those ceramics containing alumina, becomes more of a problem since these type ceramics require higher temperatures to obtain interface reaction and bonding. In addition to requiring the expensive equipment necessary to obtain the higher temperatures and the excessive time to actually coat the ceramics, a problem arises in coating high refractory ceramics with manganese and molybdenum. Due to the fact that a large part of the metal powder coating is dissipated at the high temperatures in coating with manganese and molybdenum, a second coating and firing is required to be performed, further complicating the coating process. By using a mixture of chromium and molybdenum as the coating, this additional second coating step is eliminated. Moreover, chromium provides better reaction and bonding with the high refractory ceramics then does manganese.

Approximately 10% to 50% chromium is employed as the metalizing material with the remainder being substantially molybdenum. The method of metalizing with a mixture of molybdenum and chromium is similar to that disclosed above for the molybdenum trioxide-manganese coating. Molybdenum metal powder and chromium powder are introduced into a vehicle and thoroughly mixed. Sufficient vehicle is then added to provide a workable mixture. The metallic mixture is then applied to the ceramic member 23 as by spraying or dipping to provide the desired coated surface, as for example bands 25, Figure 3. The ceramic member with the applied coating is then fired at temperatures higher than those employed for coating mixture containing manganese. The firing is done in the temperature zone lying between the melting point of the ceramics, which for one type of ceramic in common use, is 1725° C., and the sintering temperature of chromium. Excellent coatings have been obtained by employing 20% chromium, 80% molybdenum and firing the ceramic and the applied coating at a temperature of 1625° C.

While specific examples have been given in describing details of this invention, it will be understood that they have been given merely by way of illustration and that the invention is not limited thereto.

What I claim as new and desire to secure by Letters Patent of the United States is:

1. The method of metalizing the surface of ceramic members which comprises applying to said surface a mixture of metal powders in a volatile liquid vehicle, said mixture consisting essentially of pulverized molybdenum trioxide and manganese, the molybdenum trioxide comprising from 50% to 90% by weight of said mixture, heating the member and applied mixture of metallic powders in a reducing atmosphere to a temperature of from about 1200° C. to about 1400° C. to reduce the molybdenum trioxide to molybdenum, and to cause the molybdenum and the manganese to form with the ceramic a tightly adhering metallic surface.

2. The method of metalizing the surface of ceramic members including apertures therein which comprises applying to said surface a mixture of metal powders consisting essentially of pulverized molybdenum trioxide and manganese, the molybdenum trioxide comprising 90% by weight of said mixture of metal powders, and heating the member and applied powders in a reducing atmosphere to approximately 1250° C., thereby to cause said mixture to form with the ceramic a tightly adhering metallic surface.

3. The method of metalizing the surfaces of ceramic members, said members having holes therein, which comprises dipping said member in a low viscosity liquid bath comprising a mixture of pulverized metallic powders consisting essentially of manganese and molybdenum trioxide in an acetone suspension, the manganese comprising 10% to 50% by weight of said mixture, drying said member and said applied mixture, heating said member and said applied mixture in a reducing atmosphere to a temperature of from about 1200° C. to about 1400° C. to reduce the molybdenum trioxide to molybdenum and to cause the molybdenum and the manganese to form with the ceramic a tightly adhering metal surface.

4. The method of manufacturing a metalized ceramic insulator having at least one longitudinal aperture in said member, comprising the steps of immersing said member in a bath of low viscosity liquid material having a specific gravity of approximately 1.7 and consisting essentially of a volatile vehicle, and a powdered mixture of molybdenum trioxide and manganese whereby said molybdenum trioxide comprises from about 50% to about 90% of said mixture, whereby all surfaces of said member including the internal surface of said aperture thereof are uniformly coated with said material, heating said member and coated material in a reducing atmosphere to the molybdenum trioxide and the manganese to a temperature of from about 1200° C. to about 1400° C. to reduce the molybdenum trioxide to molybdenum and to cause the molybdenum and manganese to form with the ceramic a tightly adhering metallic surface and subsequently removing the coated material completely from only the transverse end surfaces of said member, whereby the remaining coating material in said aperture and on the circumferential surface of said member are substantially spaced and electrically insulated.

References Cited in the file of this patent
UNITED STATES PATENTS

| | | |
|---|---|---|
| 2,449,648 | Flaws | Sept. 21, 1948 |
| 2,667,427 | Nolte | Jan. 26, 1954 |